United States Patent [19]

Oda et al.

[11] 3,939,337

[45] Feb. 17, 1976

[54] VEHICLE LAMP CONSTRUCTION

[75] Inventors: Roy Oda, Westland; Garry O. De Frayne, Pontiac; Paul L. Walker, Royal Oak, all of Mich.

[73] Assignee: Chrysler Corporation, Highland Park, Mich.

[22] Filed: Dec. 7, 1973

[21] Appl. No.: 422,808

[52] U.S. Cl. ................ 240/8.3; 240/7.1 R; 240/151

[51] Int. Cl.$^2$ ............................................ B60Q 1/02

[58] Field of Search ......... 240/8.3, 106.1, 151, 152, 240/7.1 R, 41 SB; 313/113, 114, 115, 116; 161/239, 247; 156/71, 333

[56] References Cited

UNITED STATES PATENTS

| | | | |
|---|---|---|---|
| 2,903,437 | 9/1959 | Van Epp | 260/41.5 R |
| 2,944,578 | 7/1960 | Baldwin et al. | 260/41.5 |
| 3,010,045 | 11/1961 | Plagge et al. | 240/41 SB |
| 3,020,394 | 2/1962 | Barnhizer et al. | 240/8.3 X |
| 3,249,751 | 5/1966 | Stephens et al. | 240/8.3 X |
| 3,612,853 | 10/1971 | Aoki | 240/10.68 |
| 3,725,698 | 4/1973 | Craig | 240/41 SB |
| 3,748,458 | 7/1973 | Morrison | 240/52.1 X |
| 3,761,957 | 9/1973 | Jarret | 313/116 |

*Primary Examiner*—Samuel S. Matthews
*Assistant Examiner*—Alan Mathews
*Attorney, Agent, or Firm*—Talburtt & Baldwin

[57] ABSTRACT

A lamp assembly wherein the lens portion is secured to the lamp housing by means of an electromeric tape. The bonding tape replaces the gasket, gasket cement and retaining screws conventionally employed in current lamp assemblies.

4 Claims, 4 Drawing Figures

Fig.1.
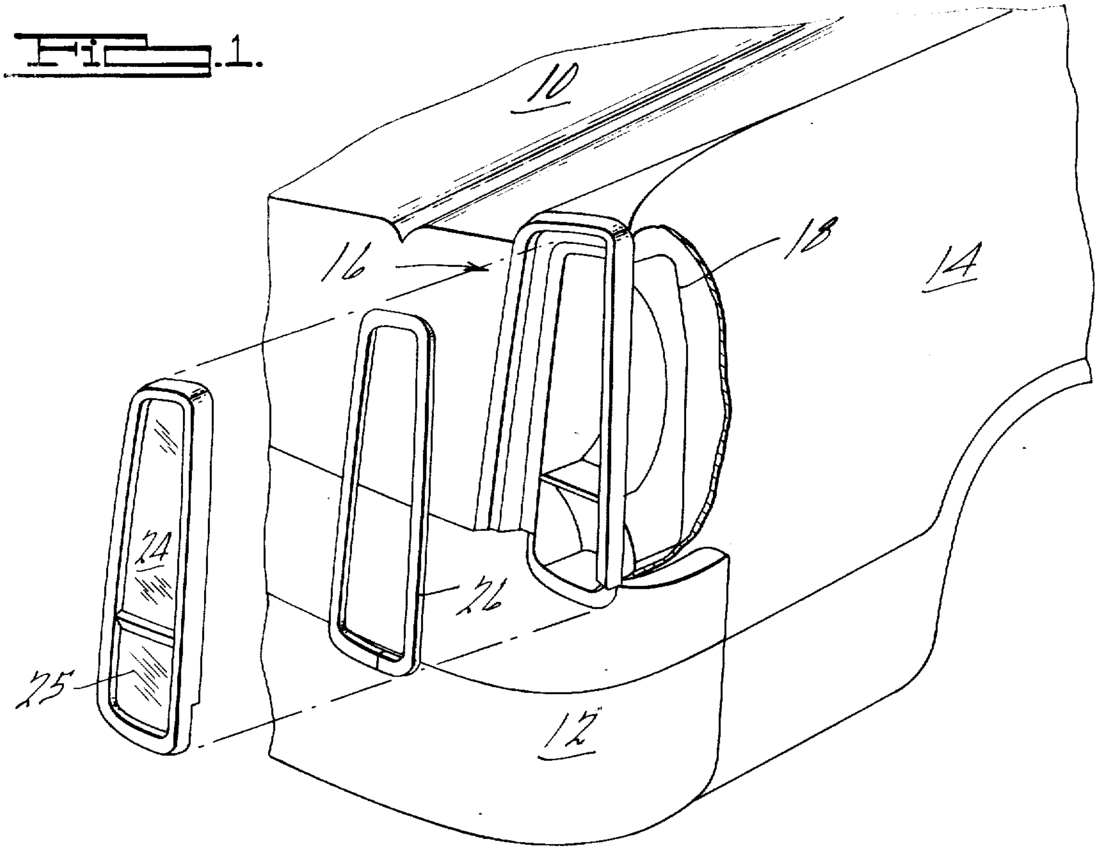
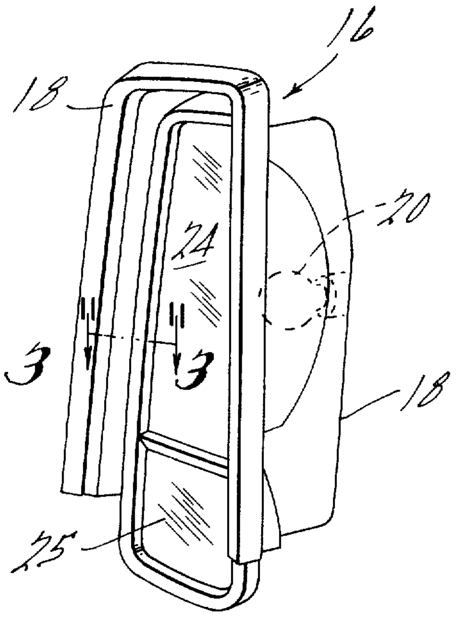
Fig.2.
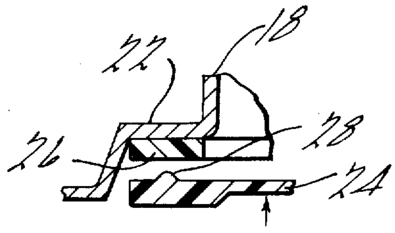
Fig.4.
Fig.3.
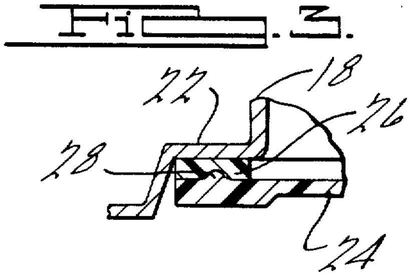

VEHICLE LAMP CONSTRUCTION

BACKGROUND OF THE INVENTION

Lamp assemblies must be made available in many varying shapes to accommodate modern design as found, for example, in the automotive industry. In addition, such lamp designs are changed almost annually wtih the result that it is generally not practical to produce such lamps in a fully sealed manner such as employed with vehicle headlights. Accordingly, lamp assemblies are conventionally manufactured by attaching the lens to the housing by first inserting a gasket therebetween, which in turn generally necessitates applying gasket cement to the housing to retain the gasket and aid in sealing, and then using screws or other fastener to mechanically hold the lens and housing in assembled relationship.

It will be appreciated that the conventional method of interconnecting lamp lens and housings requires, in a single assembly facility, many different sizes of screws and gaskets which, because of their relatively small size, are easily mishandled, dropped during assembly, improperly sorted as to size and damaged or stripped in the assembly process itself. All these factors give use to increased cost and lowering of production volume.

The present invention contemplates overcoming the above problems by providing a unique lamp structure wherein the lamp lens and housing are not joined by mechanical fasteners.

SUMMARY OF THE INVENTION

This invention relates to a lamp assembly wherein the lamp lens is secured to the lamp housing by means of a permanently pliable and flexible elastomeric material such as a butyl based tape. This bonding tape replaces the gasket, gasket adhesive and retaining screws commonly employed on presently available lamp units.

The lamp assembly of this invention provides the advantages of cost savings through elimination of gaskets, gasket adhesives, screws, and the need for designing bosses into the housing to accept the screw fasteners. In addition, the lamp assembly herein described has been found to have a superior seal with respect to dirt and moisture and to permit greater latitude in lamp design since costly bezels can frequently be eliminated.

A most important advantage of the lamp unit of this invention resides in the easier serviceability of broken lens. Thus, the old elastomeric tape can simply be peeled from the housing, new tape applied, and a new lens placed in contact with the tape.

DESCRIPTION OF THE DRAWINGS

Other objects, advantages and features of the present invention will be made more apparent as this description proceeds, reference being had to the accompanying drawings wherein:

FIG. 1 is a fragmentary perspective view of a tail light assembly in exploded position located in an automobile rear quarter panel as embodied in the present invention;

FIG. 2 illustrates the tail lamp components generally shown in FIG. 1 in an assembled relationship;

FIG. 3 is a section taken generally along section 3—3 of FIG. 2 showing the relationship of lamp housing, lens and elastomeric strip; and FIG. 4 is a view similar to FIG. 3 showing application of the lamp lens to the elastomeric strip.

DETAILED DESCRIPTION OF THE INVENTION

Referring to FIG. 1 of the drawing, there is shown fragmentarily a rear quarter area of an automotive vehicle which includes a deck lid 10, bumper 12 and quarter panel 14. The quarter panel 14 is provided with an aperture in which a tail lamp assembly 16 can be secured by conventional techniques.

It will be understood that the present invention is not limited to vehicle tail lamps and that the tail lamp is merely representative of a typical lamp to which the present invention is applicable.

The tail lamp assembly 16 comprises a cup-shaped housing 18 which is provided with a socket for receiving a lamp bulb 20. The housing 18 can be fabricated of either metal or a plastic material such as acrylo-nitrile-butadiene-styrene polymer and the lamp housing is generally formed with a peripheral flange 22. A lens 24 which is generally of a plastic material such as an acrylic polymer although it can be of glass, covers the housing opening and may include a different colored area such as back-up lamp lens 25.

The lamp assembly of this invention is unique in that the lamp lens and housing are joined to form a moisture and dirt proof cavity solely by means of an elastomeric material 26. As indicated above, there need be no mechanical attachment of the lens to the housing as by screws or clamping rings, thereby providing the advantages noted above.

The elastomeric material 26 used in the lamp assembly of this invention is a substantially non-curing permanently pliable material which is available on the market from Protective Treatments, Inc. of Dayton, Ohio and identified as 9-B-2. In general this material comprises one or more elastomers, plasticizers and fillers which may optionally include tackifiers and other agents for special purpose. Examples of elastomers useful in compounding material suitable for this invention include butyl rubber, chlorinated butyl rubber, brominated butyl rubber (for example, as described in U.S. Pat. No. 2,903,437 to Van Epp), butadiene-styrene rubbers, high molecular weight polyisobutylene rubber (for example, Vistanex polybutene B-80, B-100 and B-120), butadiene-nitrile rubbers, polychloroprenes, natural rubber, polyisoprene, ethylene-propylene rubber (for example, EPR 404, Enjay Chemical Co.) and ethylene-propylene terpolymers (for example, EPT 3509, Enjay Chemical Co.), and including ethylene-propylene-dicyclopentadiene terpolymers sold by Dutch State Mines. Ethylenepropylene terpolymers and ethylene-propylene rubber are elastomers which are random polymers of ethylene and propylene, so they can contain some block structures of ethylene or propylene in their molecular structure. In the terpolymers there is in addition an unsaturated side chain which provides a site for vulcanization. The various elastomeric polymers may be used in selected mixtures. Suitable butyl rubbers are copolymers of an olefin or a diolefin, for example, copolymers of (*a*) isobutylene with (*b*) butadiene, isoprene, dimethyl butadiene, pentadiene or piperylene, in the ratio range of about 70 to 99.5 parts of weight of (*a*) and 30 to 0.5 part by weight of (*b*), having a preferred molecular weight range of about 50,000 to 65,000 (Staudinger). Various grades of such butyl rubbers containing isobutylene are available under the designations GR-I, GR-I-17, GR-I-14, GR-I-15, GR-I-40, GR-I-60 and GR-I-80. (Examples are Enjay Butyl 365 and Enjay Butyl 218.) Suitable halogenated butyl rubbers above described, for example, as disclosed in U.S. Pat. No. 2,944,578, preferably those containing approximately one halogen atom for each double bond. Preferred chlorinated butyl rubber contains about one chlorine atom for each double bond, and has a molecular weight between 300,000 and 500,000, such as Enjay Butyl HT 10-66 of Enjay Chemical Co.

In general the various butyl rubber and chlorinated butyl rubber compositions commercially available can produce elastomeric materials exhibiting high hysteresis which is a desirable property, and are preferred, and this property can be modified by selection of other ingredients in the tape. The term butyl rubber identifies copolymers of isobutylene with a diene such as butadiene, isoprene, dimethylbutadiene, pentadiene or piperylene in the weight ratio range of about 70 to 99.5 parts isobutylene to 30 to 0.5 part of the diene component.

It is to be observed that the processing oils and other plasticizers, and the large proportion of plasticizer and filler also increase hysteresis. The use of natural rubber, butyl rubber cross linked with divinylbenzene, or polyisobutylene in the molecular weight range of about 80,000 to 120,000, polychloroprene ("neoprene") as well as other low hysteresis elastomers, is desirable. Some of these produce an increase in spring back values.

Plasticizing oils generally increase softness and increase elongation and cold flow. Processing oils serve as inexpensive plasticizers. There are hundreds of such oils, which are generally naphthenic and paraffinic hydrocarbon compounds, commercially available under the trade names of the suppliers. They are generally sold as pale or red engine oils, are free of additives, and the preferred oils are those having a viscosity range at 100° F. of about 100–4,000 SUS (Saybolt Universal Seconds). Examples of such oils by trade names are, Necton 60, Famax 58, and Coray 80 and Sun Oil 2280. They may be used in the ratio of about one to two and a half times the weight of elastomeric polymer.

Examples of other suitable plasticizers are certain polychlorinated polyphenyls known commercially as "Aroclor" 1254, Aroclor 1268, low molecular weight polyisobutylene ("Vistanex" LM-MS), medium viscosity propylene polymer (Polypropene C-175 of Amoco Chemicals Corp.), and polybutenes (for example, Oronite 128 and Polybutene H 1900). Fibrous fillers, such as asbestos and platy talcs and hydrated silicas, reduce or retard cold flow, and are present in the ratio of about 30 per cent to 150 per cent of elastomer polymer.

It is generally preferred to include tackifiers in the compositions. Examples of suitable tackifiers are chlorinated biphenyls illustrated by Aroclor 1254, Aroclor 1268 (which Aroclors also function as plasticizers) and Aroclor 1260, non-reactive polymethylol phenol resin (commercially available under the names Amberol ST-137X; Catalin 8318; and SP-1047 of Schenectady Varnish Co.), rosins, hydrogenated rosins and esterified rosins (Pentalyn H, Stay-Belite ester 3) and ethyleneglycol monobutyl ether pelargonate. Adhesion to glass and metal can be increased by incorporating known adhesion promoters, for example, gamma-amino propyltriethyloxy silane (Silane A-1100 of Union Carbide Corp.), rosins, rosin esters and the like. The silane compound may be supplied to the glass as a primer to promote adhesion.

Any of the known curing agents may be employed with the particular agent being determined primarily by the elastomer component. Paradinitrosobenzene or para-quinone dioxime with lead dioxide is a prepared curative with butyl rubbers. With chlorinated butyl rubber the preferred curing agent is zinc oxide. Suitable accelerators may be used in each case, and the compositions may include other substances to facilitate compounding and treatment such as acid receptors, scorch retardants, roll release agents, and cure retarders. In order to maintain the elastomeric material in a pliable condition throughout its life, the amount of curing agent employed is less than that amount required to effect a full cure. The following represents the components of commercially available materials used in a formulation suitable for use as the elastomeric material of this invention.

| | Component | Trade Name | Supplier |
|---|---|---|---|
| 1 | Chlorinated Butyl Rubber | Butyl HT 10-66 | Enjay Chemical Co. |
| 2 | Nonheat-reactive phenolformaldehyde resin | Amberol ST-137X | Rohm & Haas Co. |
| 3 | Hydrogenated Wood Rosin Ester | Staybelite Resin | Hercules Powder Co. |
| 4 | Asbestos fiber | 7MO6 Grade | Johns Manville |
| 5 | Hydrated Silica | Hi-Sil | PPG Chemicals |
| 6 | Platy talc | Mistvon Vapor | Sierra Talc & Chemical |
| 7 | Processing Oil | Sun Oil 2280-3 | Sun Oil Co. |
| 8 | Carbon black | P-33 Carbon black | R.T. Vanderbilt Co. |
| 9 | Tall Oil Fatty Acid | Acintol FA2 Tall Oil Fatty Acid | Arizona Chemical Co. |
| 10 | Heat-Reactive phenolformaldehyde resin | B R L 2741 | Union Carbide Corp. |
| 11 | Di-ortho-tolylguanidine salt of dicatechol borate | Permalux | DuPont |

The final composition will preferably contain at least 75 parts of oil plasticizer per 100 parts of elastomer and 75 parts of particulate filler per 100 parts of elastomer.

The elastomeric material of this invention can be employed in a tape form or as a pre-formed gasket wherein the material is packaged or supported on release paper which can easily be stripped at the time of application. Alternatively, the material can be applied in a bead from a gun type applicator. FIG. 1 illustrates elastomeric material 26 in the form of a pre-formed gasket which is laid upon the flange 22 of the lamp housing. The lens 24 is then pressed against the elastomeric material. In practice, the lamp assembly of this invention employing no mechanical fastening of the lens to the housing is being employed as a parking lamp of a production built automobile, and it has been found that excellent sealed units are obtained at room temperature when the lens is pressed against the elastomeric material with a pressure of about ten pounds per linear inch of bond length for a period of about five to ten seconds. The pressure should be sufficient to compress the elastomeric material in the area of the lens an amount of about one-half the thickness of the material. Specific time and pressures will of course be dependent on the tape composition employed.

The composition of the elastomeric material used in the lamp unit of this invention should be chosen so that it remains flexible and soft throughout its anticipated service life and should be of a thickness to insure sealing contact with both the irregular flange surface 22 of the housing and with the lens 24. A thickness of about 0.1 to 0.5 inch with a width of 0.25 to about 0.5 inch has been found sufficient to allow absorption or attenuation of tension forces by deformation without damage to the bond between elastomer and lens, or elastomer and housing. If desired, a rib 28 may be provided about the periphery of the lens as seen in FIGS. 3 and 4 to engage and embed in the elastomeric material. This has the advantage of providing a superior seal as opposed to planar surface contact.

It will be understood that this invention is not restricted to any particular type of lamp and that various changes and modifications may be made without departing from the scope thereof.

We claim:

1. A repairable lamp unit comprising a housing having a cavity for location therein of a lamp bulb, a lens for covering the open end of said cavity and in cooperation with said housing enclosing said lamp bulb, and a pliable tacky substantially noncuring elastomeric material having a surface in adhering contact with said housing and a second surface portion in adhering contact with said lens, said lens and housing being releasably held in a sealed and assembled relationship by said elastomeric material with said elastomeric material permitting removal of said lens from said lamp unit without damage of said lens and housing, said elastomeric material forming the sole means by which the lens is joined to said housing.

2. A lamp unit according to claim 1 wherein said lamp housing is provided with a peripheral flange having a face generally parallel to the plane of the open end of said cavity and wherein said strip of elastomeric material interposed between said lens and said housing is in adhering contact with said flange.

3. A lamp unit according to claim 1 wherein said strip of elastomeric material is a highly viscous, smooth, permanently tacky, putty-like mass at the time it is interposed between said lamp lens and housing.

4. A lamp unit according to claim 1 where said strip of elastomeric material is selected from the group consisting of butyl rubber, divinylbenzene cross-linked butyl rubber, and mixtures thereof.

* * * * *